US010712086B2

(12) United States Patent
Strijbos

(10) Patent No.: US 10,712,086 B2
(45) Date of Patent: Jul. 14, 2020

(54) METHOD FOR GRASPING A ROW OF MULTIPLE BLOCKS OF FROZEN FOOD ORIGINATING FROM A PLATE FREEZER, AND VARIOUS USES THEREOF

(71) Applicant: Frank Peter Johan Strijbos, Kronenberg (NL)

(72) Inventor: Frank Peter Johan Strijbos, Kronenberg (NL)

(*) Notice: Subject to any disclaimer, the term of this patent is extended or adjusted under 35 U.S.C. 154(b) by 152 days.

(21) Appl. No.: 15/749,827

(22) PCT Filed: Aug. 5, 2016

(86) PCT No.: PCT/NL2016/050571
§ 371 (c)(1),
(2) Date: Feb. 2, 2018

(87) PCT Pub. No.: WO2017/026893
PCT Pub. Date: Feb. 16, 2017

(65) Prior Publication Data
US 2018/0231302 A1 Aug. 16, 2018

(30) Foreign Application Priority Data
Aug. 8, 2015 (NL) ...................................... 2015285

(51) Int. Cl.
*F25D 31/00* (2006.01)
*A23B 4/06* (2006.01)
*A23L 3/36* (2006.01)
(52) U.S. Cl.
CPC ............ *F25D 31/001* (2013.01); *A23B 4/064* (2013.01); *A23L 3/362* (2013.01); *F25D 2400/30* (2013.01)

(58) Field of Classification Search
CPC .............. F25D 31/001; F25D 2500/02; F25D 2400/30; F25D 25/04; A23B 4/064; A23L 3/362; A23L 3/364
See application file for complete search history.

(56) References Cited

U.S. PATENT DOCUMENTS 3,985,223 A * 10/1976 Forcella ............... B65G 47/842
198/377.03
4,343,590 A 8/1982 D'Aloisio
(Continued)

FOREIGN PATENT DOCUMENTS

CN 102430663 A 5/2012
CN 103318652 A 9/2013
(Continued)

*Primary Examiner* — Elizabeth J Martin
(74) *Attorney, Agent, or Firm* — Richard M. Goldberg

(57) ABSTRACT

A method for grasping a row of multiple separate blocks of frozen food originating from a plate freezer, the row extending in a longitudinal direction corresponding to the longitudinal direction of the plate freezer, includes the steps of grasping the row of blocks along its opposing lateral edges by closing a clamp (1) having two grasping elements (2, 20) that extend along the opposing lateral edges of the row, wherein at least one of the grasping elements along its length includes multiple separate pinching elements (4, 40), each element for pinching one or more of the blocks, the pinching elements being individually movable with respect to the at least one grasping element in a direction perpendicular to the longitudinal direction of this grasping element, the method further including adjusting the lateral position of each pinching element when closing the clamp, by individually moving each pinching element.

9 Claims, 6 Drawing Sheets

(56) References Cited

U.S. PATENT DOCUMENTS

2009/0097956 A1  4/2009  Landes et al.
2012/0280527 A1  11/2012  Lin et al.

FOREIGN PATENT DOCUMENTS

| CN | 103625919 A | 3/2014 | |
| EP | 1359101 A2 * | 11/2003 | ........... B65G 47/907 |
| EP | 1359101 A2 | 11/2003 | |
| EP | 2273220 A2 | 1/2011 | |
| WO | 2007/067062 A1 | 6/2007 | |
| WO | WO-2007067062 A1 * | 6/2007 | ............. A23B 4/064 |

* cited by examiner

METHOD FOR GRASPING A ROW OF MULTIPLE BLOCKS OF FROZEN FOOD ORIGINATING FROM A PLATE FREEZER, AND VARIOUS USES THEREOF

GENERAL FIELD OF THE INVENTION

The present invention in general pertains to a method for grasping a row of multiple separate blocks of frozen food originating from a plate freezer, the row extending in a longitudinal direction corresponding to the longitudinal direction of the plate freezer. The invention also pertains to a method for unloading a row of multiple blocks of frozen food from a vertical plate freezer, a method for filling and unloading a vertical plate freezer, a clamp for grasping a row of multiple blocks of frozen food, a system for filling and unloading a vertical plate freezer and a hopper for use in one of these methods or system.

BACKGROUND OF THE INVENTION

Plate freezers, in particular vertical plate freezers are commonly used to freeze food (for human or animal consumption). A vertical plate freezer consists of a number of parallel plates, mounted vertically, through which a refrigerant runs. The plates are positioned interdistantly to leave a row of multiple freezing compartments, also called "pockets", between the plates. The product is simply poured into the pockets between the plates and will be frozen as blocks. A plate freezer enables rapid freezing of raw food products through its direct contact method of freezing, which offers a significant energy saving and reduced freezing time. These costs savings are also benefitted by the fact the product is poured directly into the freezer, not requiring expensive packaging material which can increase freezing time and is liable to get damaged during use. Semi-automated loading and unloading systems allow a high product throughput for very low labour costs. Various types of plate freezers are described in EP 2273220 A2.

Loading typically takes place by (automatically) guiding a flexible tube to the upper (open) side of the plate freezer. Through this tube liquid food material is pumped into the pockets of the freezer. Unloading typically takes place by lifting the frozen blocks out of the pockets. Thereafter, filling plates (also called fitting panels) are manually positioned in between the blocks and the complete row is clamped by pressing the proximal and distal end of the row of block with filling plates to each other using a large clamp. This way, the blocks can be transported to another location. Alternatively, no filling plates are positioned between the blocks. In this case the blocks are firstly, very gently, moved until they are contiguous. Thereafter the row of blocks can be grasped at the proximal and distal end. This method however is very time consuming and prone to faults due to falling block (the "Domino Effect"). A more expensive system to unload the freezer is to release the blocks to a belt underneath the freezer, whereafter the blocks are transported by moving the belt, optionally after filling plates have been positioned in between the blocks to try and prevent the Domino Effect.

OBJECT OF THE INVENTION

It is an object of the invention to provide for an improved method for grasping a row of separate blocks of frozen food that can be used for unloading a plate freezer, in particular a vertical plate freezer. It is another object of the invention to provide for an improved method and system for filling and unloading a vertical plate freezer. Other objects of the invention are to provide for objects for use in these methods and system, in particular an improved clamp for grasping a row of multiple blocks of frozen food and a hopper for dosing liquid food material.

SUMMARY OF THE INVENTION

In order to meet the first object of the invention a method as outlined in the GENERAL FIELD OF THE INVENTION section here above has been devised, characterised in that the method comprises grasping the row of blocks along its opposing lateral edges by closing a clamp having two grasping elements that extend along the said opposing lateral edges of the row, wherein at least one of the grasping elements along its length comprises multiple separate pinching elements, each pinching element being provided for pinching one or more of the blocks, the pinching elements being individually movable with respect to the at least one grasping element in a direction perpendicular to the longitudinal direction of this grasping element, the method further comprising adjusting the lateral position of each pinching element when closing the clamp, by individually moving the each pinching element with respect to the at least one grasping element to evenly pinch the blocks (i.e. to aim at such even pinching).

Applicant found a way to overcome disadvantages of prior art grasping methods. Applicant recognised that lateral grasping of the rows of multiple block of frozen food could be advantageous since this would mean that fitting panels or pushing the blocks together could be dispensed with: when using a clamp having two grasping elements that extend in parallel along the length of the clamp, the row could be grasped as whole by clamping the elements to the two opposing lateral sides of the row. Since the clamping action in this case is not negatively influenced by open spaces in the length direction of the row, the fitting panels can be dispensed with. However, grasping the row of blocks laterally could lead to an uneven pinching of the blocks. The length of a typical row (3 to 5 meters) makes it difficult to construct a longitudinal grasping element that does not bend over its length (which bending would lead to less pinching pressure at the top of the bend). Moreover, given the high number of blocks of frozen food, the blocks inherently have slightly varying dimensions (even if in the millimetre range), which does result in differences in pinching pressure per block over the length of the grasping element. Without posing very strict mechanical requirements, this results in some blocks being crushed laterally, while other are hardly pinched and thus cannot be grasped adequately. Imposing the needed mechanical restrictions would make the freezing and grasping machines very expensive. Applicant has devised a solution to this problem by introducing two new features for (at least) one of the longitudinal grasping elements: the first feature being that the element along its length comprises multiple separate pinching elements, each element is for pinching one or more of the blocks. The second feature is that each pinching element is individually movable in the pinching direction.

The combined effect of these two features is that the risk of bending of the longitudinal grasping element is significantly lower or even virtually nil, and also that variations in the block dimensions no longer affect the pinching pressure over the complete length of the grasping element. Differences in dimensions can be adjusted locally at each pinching element by adjusting the lateral position of each pinching element when closing the clamp. By individually moving the pinching elements with respect to the grasping element, it is possible to evenly pinch the blocks even when the row is very long, even when the mechanical restrictions (dimensional preciseness) of the machines do not meet stringent demands. It is noted that the individual moving of the elements may be simply accomplished by passively adjusting the position of the pinching elements for contacting the blocks, for example using a spring or other means to force the pinching element in a direction away from the grasping element until an adequate counter force is established (due to meeting the blocks).

This new grasping method opened the way to a new method of unloading a plate freezer by grasping the blocks when forced out of the plate freezers. Next to this, it was applicant's recognition that by having a clamp available that laterally grasps the row of blocks, a new method and system for filling and unloading a vertical plate freezer cold be devised. This can be understood as follows. A clamp that laterally grasps the row of blocks necessarily extends over the full length of the plate freezer. This opens the way to use the clamp not only for grasping the blocks for unloading the plate freezer, but also for carrying a longitudinal hopper that is suitable for evenly filling the pockets of the plate freezer. For even automatic filling namely ("even" in this sense meaning that the larger part of the pockets, preferably more than 95%, get filled for more than 80%), a hopper would need to have a length corresponding to the length of the plate freezer, such that each pocket can be dosed with the same amount of liquid food during the same time period. Recognising that both the hopper and the clamp advantageously have about the longitudinal dimensions, the clamp could also be used to carry the hopper towards the plate freezer. This has the major advantage that one transport system can be used for transporting a hopper for filling the pockets of the freezer, as well as for the clamp to unload the blocks from the freezer. The resulting method for filling and unloading the freezer this way comprises taking the clamp having two grasping elements that extend in parallel along the length of the clamp, grasping a hopper with the clamp, filling the hopper with liquid food (either before or after grasping the hopper with the clamp), transporting the hopper to a dosing site above the freezer, dosing the liquid food into the freezing compartments by releasing the liquid food from the hopper, freezing the food in the compartments thereby forming a row of multiple blocks of frozen food, transporting the hopper away from the freezer (typically right after filling of the compartments, but the moment of transport is not critical for the invention in its broadest sense), releasing the hopper from the clamp, transport the clamp back to the freezer and grasping the row of blocks by closing the clamp along the opposing lateral edges of the row of multiple blocks of frozen food.

The invention also pertains to a hopper for use in any of the above methods or systems. This hopper has a longitudinal dosing opening with a length that corresponds to the length of the vertical plate freezer to be filled, the opening being provided with a rotatably arranged cylinder that closes the longitudinal opening, the cylinder being provided with at least one longitudinal slot to receive the liquid food when directed to the interior of the hopper and, after rotation of the cylinder, to release the liquid food from the hopper when directed to the exterior thereof.

DEFINITIONS

Automatically means without the need of operator intervention. It does not exclude that an action is operator initiated or stopped.

Frozen food pertains to human as well as animal food (the latter also referred to as feed).

To evenly pinch multiple blocks while grasping these blocks means that all blocks are adequately pinched, preventing on the one hand that one or more blocks are crushed while being grasped and on the other hand that one or more blocks are not being grasped at all.

To close an opening means that the opening has a closure such that passage of material to be transported through the opening when open is restricted or even completely prevented.

EMBODIMENTS OF THE INVENTION

In an embodiment of the invention for grasping the row of blocks, both grasping elements along their respective length comprise multiple separate pinching elements that are individually movable with respect to the corresponding grasping element in a direction perpendicular to the longitudinal direction of this element.

In another embodiment each pinching element has a dimension in the said longitudinal direction corresponding to at most three blocks. By pinching at most three blocks, the negative influence of varying dimensions of the blocks is decreased further.

In yet another embodiment each pinching element has a dimension in the said longitudinal direction corresponding to at most one block. In this embodiment each pinching element corresponds to one block, or even multiple pinching elements correspond to one block. This means that even when neighbouring blocks have significant different dimensions, the pinching can still be even since for each individual block the lateral position of the pinching element(s) can be adjusted.

In still another embodiment each pinching element has a surface for grasping the one or more blocks, wherein that the surface is roughened. This provides for more grip on the frozen blocks. In a further embodiment the surface comprises macroscopic teeth, preferably pivoted upwardly.

In again another embodiment each pinching element is spring loaded with respect to the corresponding grasping element. A spring can be advantageously used to individually adjust the lateral position of each pinching element when closing the clamp.

In an embodiment of the new filling and unloading method according to the invention, in which embodiment multiple vertical plate freezers are used, the method comprises consecutively filling the multiple plate freezers by transporting the hopper while grasped by the clamp to each of the freezers, and after the food is frozen, consecutively unloading the freezers using the clamp for grasping at each freezer, the opposing lateral edges of the row of multiple blocks of frozen food. It was found that a combined use of only one clamp for filling and unloading the plate freezers even allows multiple, typically up to 10 plate freezers, to be continuously run for freezing food. Typically, when the $8^{th}$ to $10^{th}$ freezer has been filled, the blocks in the first freezer are sufficiently frozen to be unloaded. The number of freezers to be run continuously depend i.a. on the freezing speed of these freezers.

The invention will be outlined in greater detail using the following examples for the clamp, hopper and combined use thereof for use in the invention.

BRIEF DESCRIPTION OF THE DRAWINGS

FIG. 1b is a perspective view of the clamp of FIG. 1a.

FIG. 4a is an elevational view of a closing cylinder of the hopper of FIG. 3.

FIG. 4b is a perspective view of the closing cylinder of FIG. 4a.

DETAILED DESCRIPTION

FIG. 1

Figure 1A:
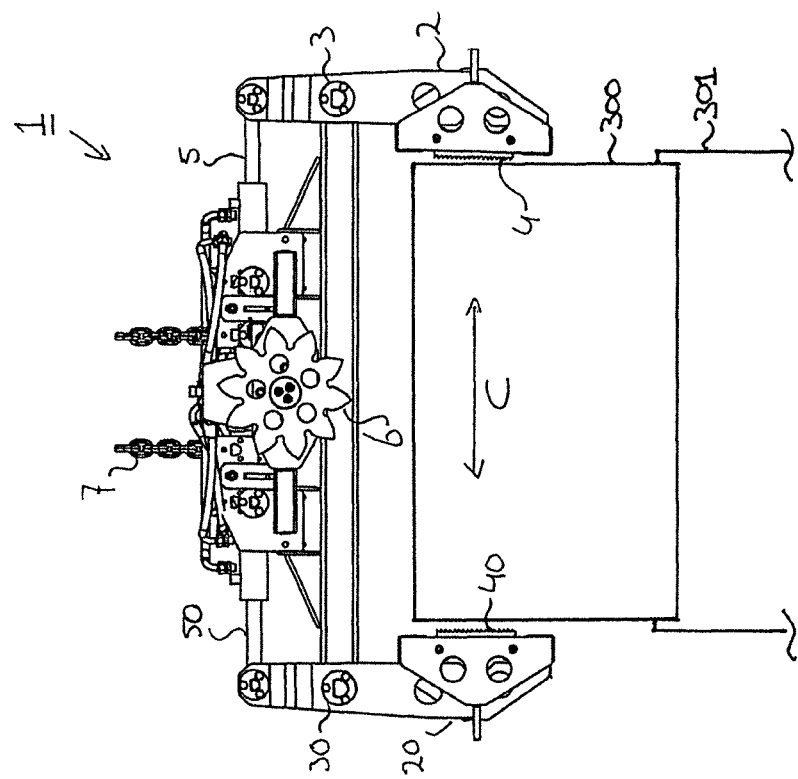
FIG. 1a is a schematic elevational view of a clamp for use in the invention.
Figure 1B:
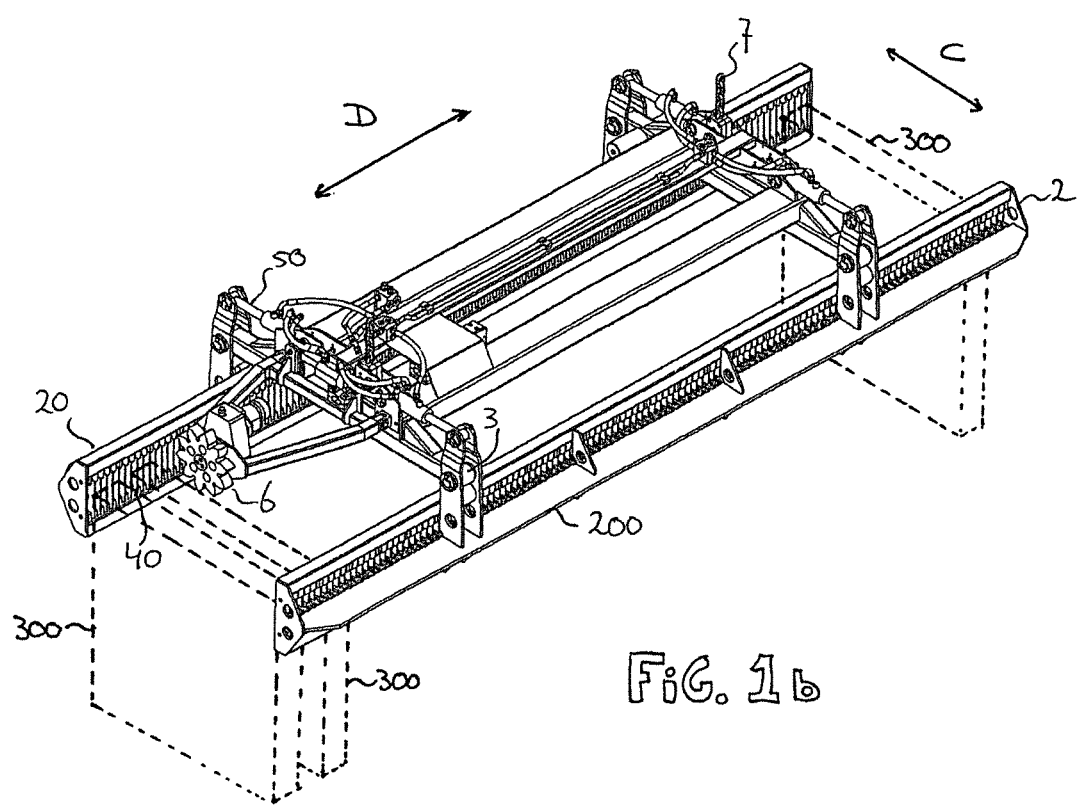

FIG. 1, composed of sub-figures "a" and "b", is a schematic view of a clamp 1 for use in the invention. As depicted in FIG. 1a, basically the clamp 1 comprises two elongated grasping elements 2 and 20, of which only the sides are shown in FIG. 1a. These elements have a typical length (in the direction of view) of 3 to 6 meters, corresponding to the length of typical (vertical) plate freezers 301. The grasping elements are hinged around hinge elements 3 and 30 respectively. By using hydraulic cylinders 5 and 50, the grasping elements can be moved, such that the pinching elements 4 and 40 can be moved in a direction C, perpendicular to the longitudinal direction D of each grasping element. In FIG. 1a only one pinching element per grasping element is shown. However, in the longitudinal direction, in this embodiment 20 of these pinching elements per meter of length are provided. This can be seen in more detail in FIG. 1b. In this figure, it can be seen that each of the elongated grasping elements comprises multiple pinching elements (the details of which pinching elements can be seen in more detail in FIG. 2) for grasping a row of blocks 300. Each of these pinching elements is spring loaded with respect to a bar like member (only member 200 is shown in FIG. 1b), part of the elongated grasping element.

In FIG. 1a it is shown that the clamp 1 also comprises a sprocket 6. This sprocket can be used to drive an external mechanism, in particular the mechanism of a hopper when carried by the clamp (see FIG. 5). The clamp is provided with chains 7 to hang the clamp from a rail system to transport the clamp through the open space.

FIG. 2

Figure 2:
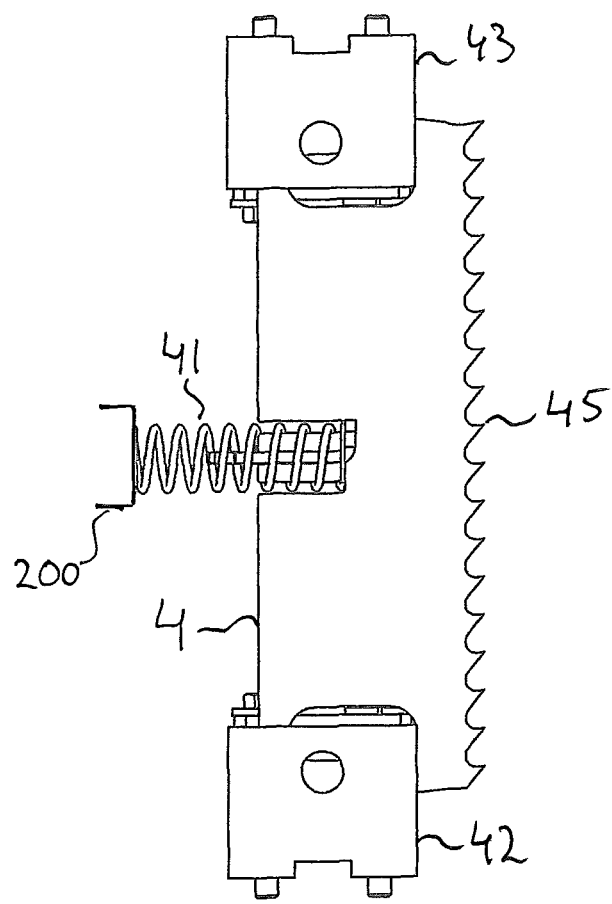
FIG. 2 is a detailed view of a pinching element of the clamp of FIG. 1.

FIG. 2 is a detailed view of a pinching element 4 of the clamp of FIG. 1. In this view only one of the multiple neighbouring pinching elements 4 is depicted. This element is restricted in its side-way movement using blocks 42 and 43. It is noted that this side-way movement is the longitudinal direction of the clamp and grasping element 2, of which latter element part of longitudinal bar member 200 is shown in FIG. 2. The pinching element 4 can move individually with respect to the bar 200 (part of the grasping element 2) in a direction perpendicular to the longitudinal direction of this bar. For this, each pinching element is spring-loaded with a spring 41 with respect to bar 200. Each spring pushes the corresponding pinching element forward until an equal counter force is reached upon sufficiently pinching a block of frozen food. In this particular embodiment the pinching elements 4 are dimensioned in the longitudinal direction of the clamp such that each individually spring loaded pinching element can only grasp one block at a time.

This way, by individually moving the pinching elements with respect to the bar 200 of grasping element 2, the lateral position of each pinching element when closing the clamp is individually adjusted to enable and evenly pinch all the blocks in the row. The surface of the pinching elements is roughened by providing macroscopic teeth 45. Such teeth, in this case pivoted slightly upwardly, improve the grip the pinching elements have on the blocks of frozen food.

In an alternative embodiment (not shown), three elements 4 as shown in FIG. 2 are connected at their back using a small sub-bar. This sub-bar is then spring-loaded with respect to bar 200. This combined three-way pinching element is one element that can be individually moved in the sense of the present invention. In this embodiment the dimension of the pinching element in the longitudinal direction of the clamp may correspond to multiple blocks, for example to three blocks. This means that each pinching elements pinches up to three blocks at a time.

FIG. 3

Figure 3:
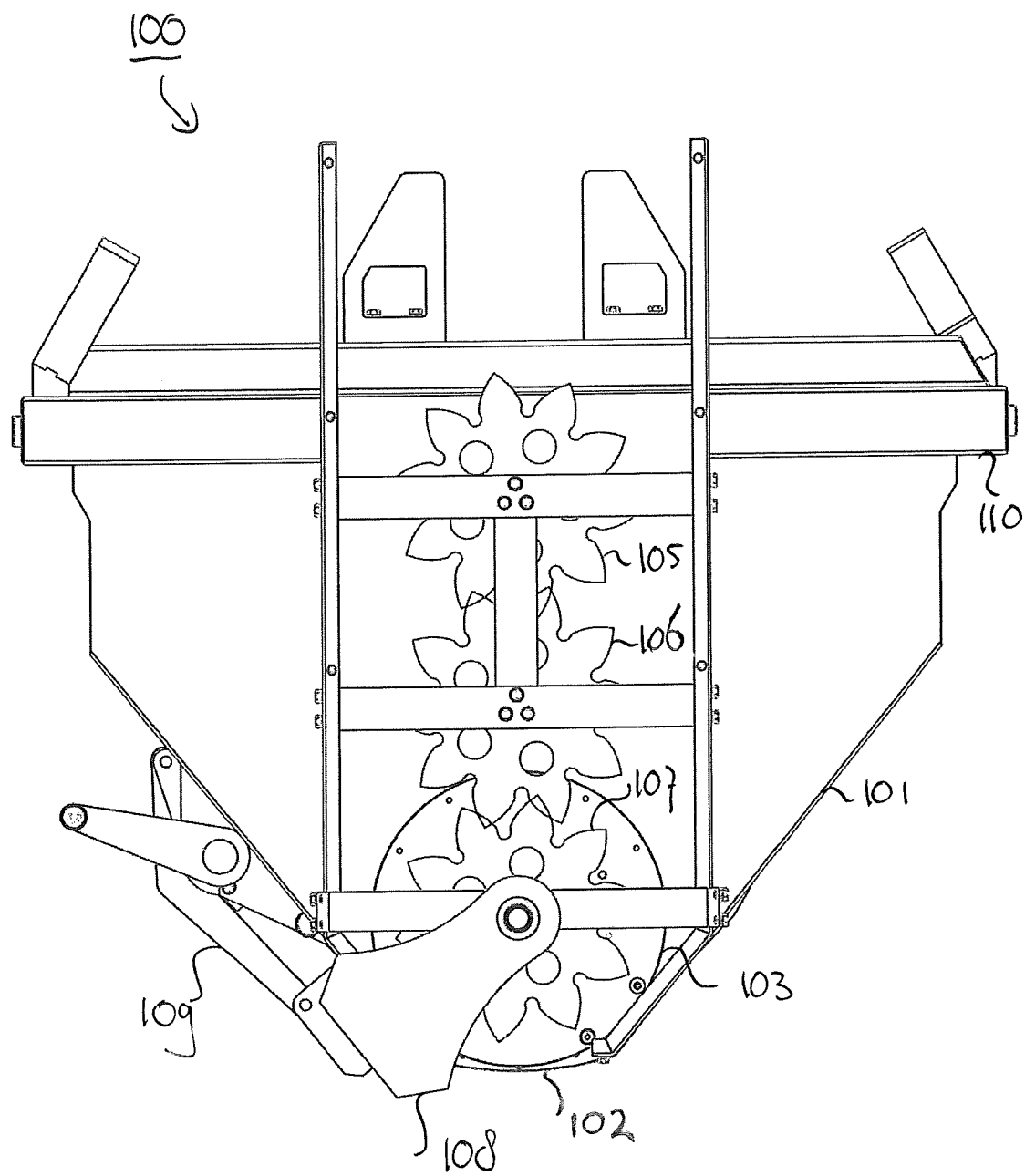
FIG. 3 is a schematic side view of a hopper for use in the invention.

FIG. 3 is a schematic side view of a hopper 100 for use in the invention. This hopper consists of a main unit 101, which unit is open at its top end (for filling purposes) and has an opening 102 that is closed by cylinder 103 at its bottom. The opening 102 is in fact a longitudinal rectangle that extends over the full length of the hopper (in the direction of view of FIG. 3). The cylinder fits this opening and slidably closes it so that the contents of the hopper cannot freely run out of it. A slight leaking of fluid may arise. Hence the presence of tray 108 underneath the hopper. This tray is for collecting fluids that leak from the hopper (if any) during transport. Using arm 109, the tray can be moved away from the actual opening 102 of the hopper when the hopper is used for filling the pockets of a plate freezer (as shown in FIG. 3).

Figure 4:
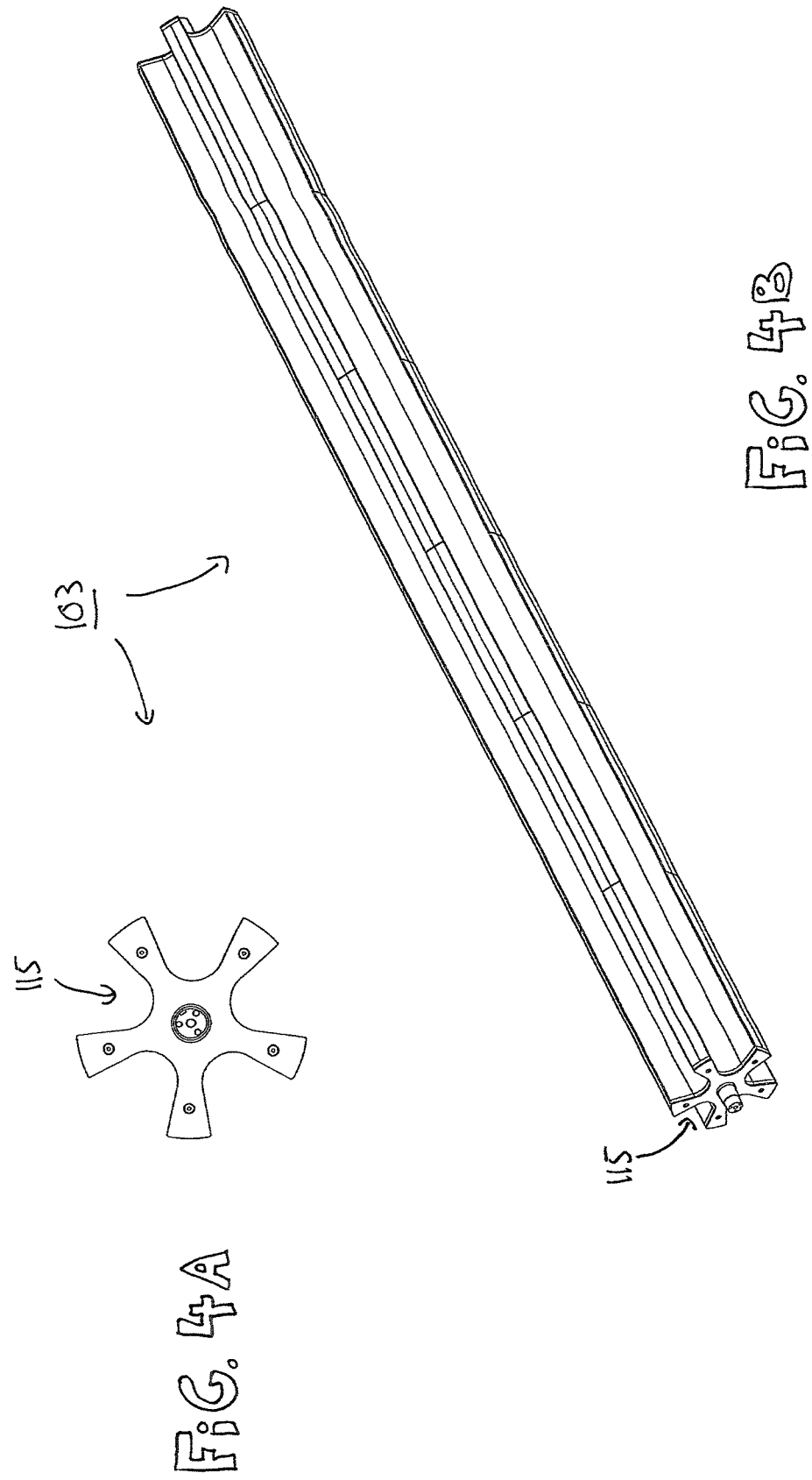
Figure 5:
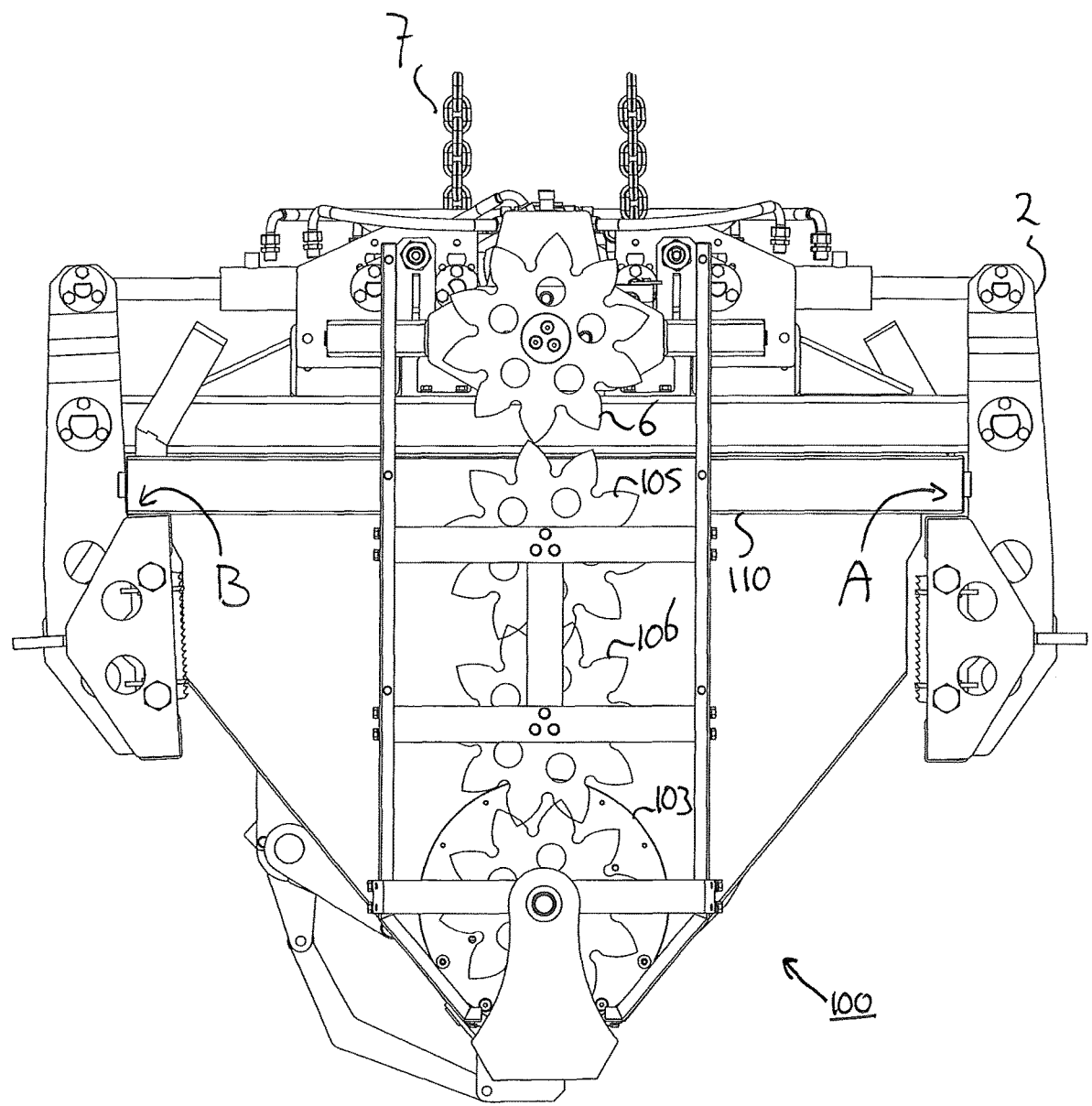
FIG. 5 schematically shows the hopper of FIG. 3 carried by the clamp of FIG. 1.

The hopper is provided with an upper frame 110 to provide for dimensional strength and a surface for clamp 1 to carry the hopper (see FIG. 5). Also provided is a series of sprockets 105, 106 and 107 to rotate the cylinder 103, needed for dosing the contents of the hopper through its opening 102 to a plate freezer underneath the hopper (see FIG. 4 for details of the dosing slots in the cylinder 103).

Although not visible in FIG. 3, the interior of the hopper is provided with multiple transversely positioned plates to provide for adequate stiffness. This may be relevant to make sure the cylinder and opening keep their mutual (liquid tight) arrangement, depending i.a. in the thickness of the wall of the hopper and the material to be fed. These transverse plates have one or more holes to enable the liquid food to be distributed automatically over the length of the hopper (e.g. based on gravity alone, optionally helped with a distributing means such as a scraper).

FIG. 4

FIG. 4, comprised of figures A (side view) and B (birds eye view), is a detailed view of a closing cylinder of the hopper of FIG. 3. As can be seen in FIGS. 4A and 4B, the cylinder is provided with multiple longitudinal slots 115. Each of these slots is for receiving the liquid food when directed to the interior of the hopper and, after rotation of the cylinder 103, for releasing the liquid food from the hopper through opening 102 (see FIG. 3) when directed to this opening.

FIG. 5

FIG. 5 schematically shows the hopper 100 of FIG. 3 carried by the clamp 1 of FIG. 1. In this view it can be seen that the hopper, with its frame 110 rests on grasping elements 2 and 20 at locations indicated with A and B respectively. The hopper can be released by opening the clamp, for example when the hopper is situated while resting on a supporting structure (not shown).

As can be seen in FIG. 5, when the hopper is carrier by the clamp, the sprocket 6 of the clamp meets the upper sprocket 105 of the hopper. This way, by rotating sprocket 6 using a motor (not shown) present on the clamp, the opening/closing cylinder 103 of the hopper can be actuated.

In practice, in a freezer facility up to 10 plate freezers may be filled and unloaded using one clamp and corresponding hopper. In a filling station, the hopper while lying stationary on a supporting structure is filled with liquid food sufficient to fill the 10 plate freezers. Thereupon, the clamp is transported (via a rail system attached to the roof of the facility) to the hopper and the filled hopper is grasped by the clamp as shown in FIG. 5. Then, the hopper is transported to the first plate freezer. When the hopper is situated exactly in line with the plate freezer, the tray 108 is taken away from the opening and the dosing of the liquid food into the pocket starts by rotating the dosing cylinder 103. When the pockets of the freezer are all filled the rotating and therewith the dosing of the liquid food is halted. Tray 108 is moved back in front of the hopper opening to prevent even the slightest spilling of liquids from the hopper to the floor of the facility. The hopper, still being carried by the clamp is then transported to the next plate freezer. This process is repeated until all freezers are filled with the liquid food. As soon as the last freezer is filled, the blocks of food in the first freezer have become adequately frozen. The clamp releases the hopper at its supporting structure and is now used for unloading the blocks from the first freezer. After the blocks have been pushed partly out of the freezer, the row of blocks is taken from the freezer in line with the current invention and carried towards a downstream processing station (as known in the art). The other freezers are unloaded the same way, in the same order as they have been filled. Thereafter, the whole cycle may be repeated to provide another 10 rows of blocks of frozen food.

For the present invention to be advantageously used, there is no explicit need to fill all pockets of the plate freezer and unload them with one and the same clamp. It is for example envisioned that two or more clamps are being used (or the same clamp multiple times to unload the freezer), for example when the plate freezer is extremely long. Any other reason however for which a clamp is used that does not have the same length as the freezer (and thus optionally a hopper that does not have the same length as the freezer) may be present. These variations are also covered by the appended claims.

The invention claimed is:

1. A method for grasping a row of multiple separate blocks of frozen food originating from a plate freezer, the row extending in a longitudinal direction corresponding to a longitudinal direction of the plate freezer, the method comprising the steps of:
   grasping the row of blocks along opposing lateral edges thereof by closing a clamp having two grasping elements that extend along the said opposing lateral edges of the row, wherein at least one of the grasping elements along a length thereof comprises multiple separate pinching elements,
   providing that each pinching element is adapted for pinching one or more of the blocks and is movable separately relative to other pinching elements of each of the at least one of the grasping elements,
   individually moving each pinching element relative to other pinching elements of each of the at least one of the grasping elements in a direction perpendicular to a longitudinal direction of this grasping element, and
   adjusting a lateral position of each pinching element relative to other pinching elements of each of the at least one of the grasping elements when closing the clamp, by individually moving each pinching element with respect to the at least one grasping element to evenly pinch the blocks.

2. The method according to claim 1, wherein both grasping elements along their respective length comprise multiple separate pinching elements that are individually and separately movable with respect to the corresponding grasping element in a direction perpendicular to the longitudinal direction of this element.

3. The method according to claim 1, wherein each pinching element has a dimension in the said longitudinal direction corresponding to at most three blocks.

4. The method according to claim 1, wherein each pinching element has a dimension in the said longitudinal direction corresponding to at most one block.

5. The method according to claim 1, wherein each pinching element has a surface for grasping the one or more blocks, and wherein the surface is roughened.

6. The method according to claim 5, wherein the surface comprises macroscopic teeth.

7. The method according to claim 1, wherein each pinching element is spring loaded with respect to the corresponding grasping element.

8. The method for unloading a row of multiple blocks of frozen food from a vertical plate freezer, the blocks forming a row of separate frozen units extending in a longitudinal direction of the plate freezer, the method comprising the steps of forcing the row of blocks at least partly out of the plate freezer and grasping the row of blocks using a method according to claim 1.

9. A clamp for grasping a row of multiple blocks of frozen food originating from a plate freezer, the clamp comprising two grasping elements that extend along a length of the clamp, wherein at least one of the grasping elements along a length thereof comprises multiple separate pinching elements, each pinching element for pinching one or more blocks, the pinching elements being individually and separately movable relative to other pinching elements of each of the at least one of the grasping elements in a direction perpendicular to a longitudinal direction of this grasping element.

* * * * *